March 24, 1959
O. BRENDEN
2,878,568
SAG GAUGE
Filed March 1, 1954
3 Sheets-Sheet 1
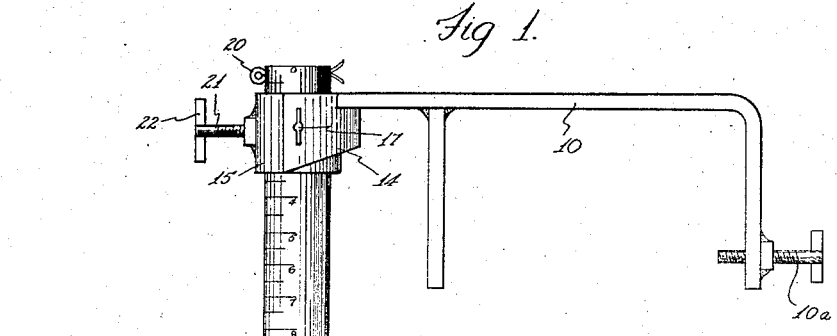
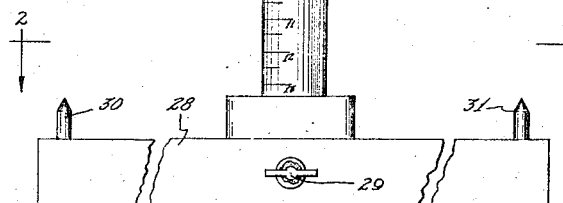
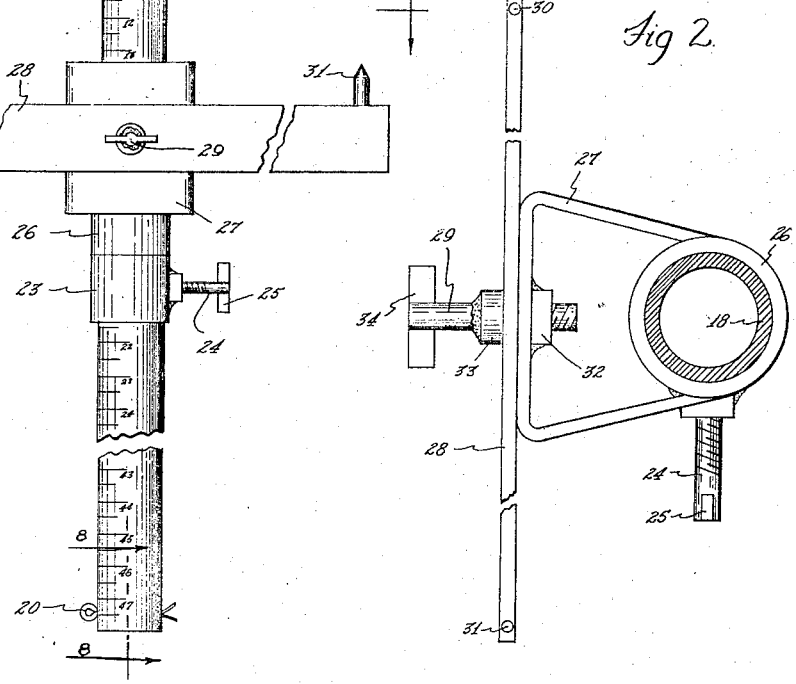
INVENTOR.
Orval Brenden
BY GreekWells
Atty.

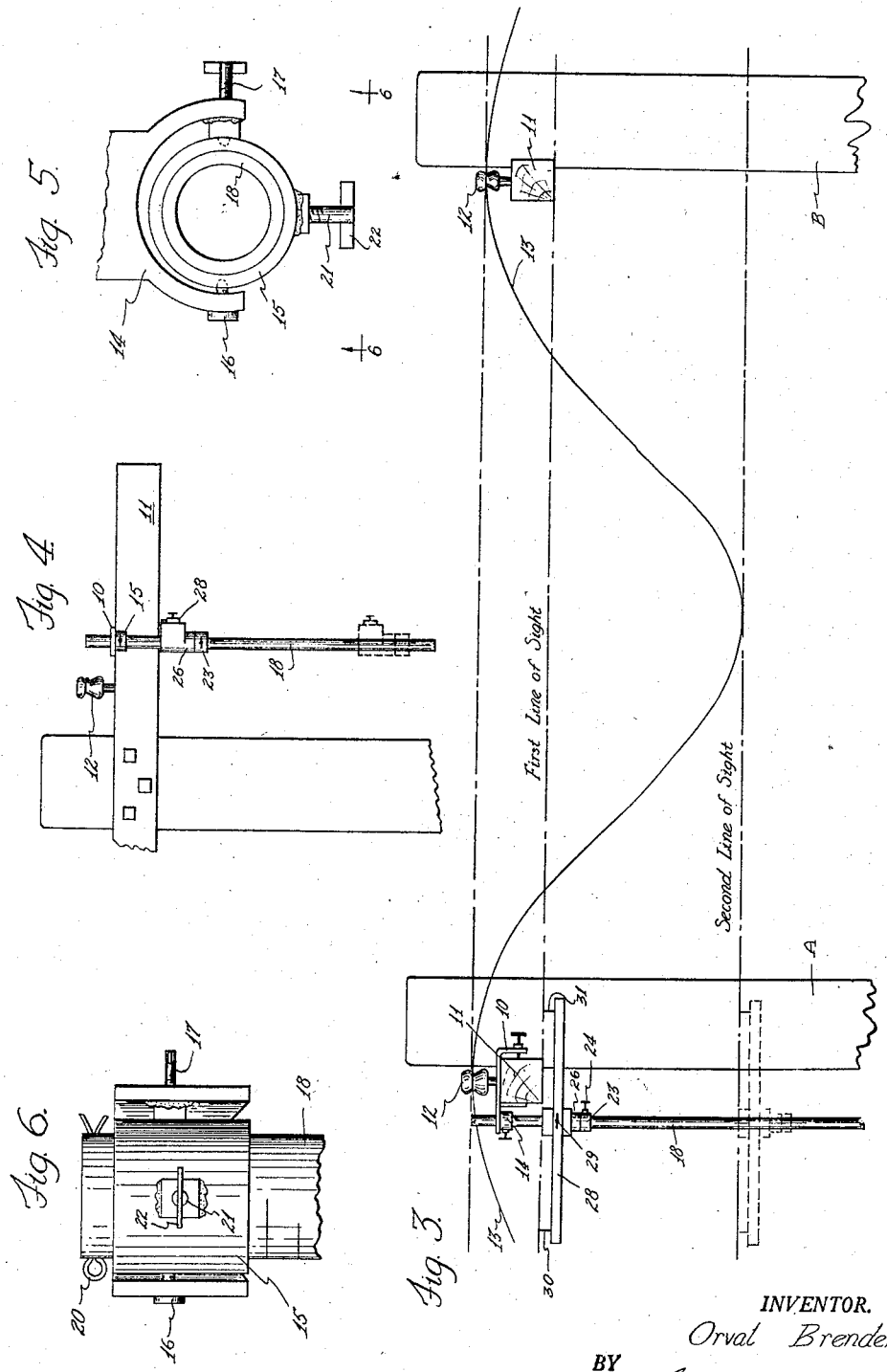

March 24, 1959　　　O. BRENDEN　　　2,878,568
SAG GAUGE

Filed March 1, 1954　　　　　　　3 Sheets-Sheet 3

INVENTOR.
Orval Brenden
BY GreekWells
Atty.

United States Patent Office 2,878,568
Patented Mar. 24, 1959

2,878,568

SAG GAUGE

Orval Brenden, Lowell, Oreg.

Application March 1, 1954, Serial No. 413,178

2 Claims. (Cl. 33—46)

My invention relates to a sag gauge. When conductors for electricity are strung from structure to structure or from pole to pole, they sag a certain amount between the supports. The amount of sag which a conductor should have depends upon the nature and gauge of wire used, the temperature encountered and the span length between supports. In the maintenance of these transmission lines, it is often necessary to take measurements to determine when the conductors have the proper amount of sag or tension. Where it is convenient these determinations may be made by measuring the actual tension in pounds of pull on the conductor or by measuring the rate of oscillation of the wire. The most simple method in difficult terrain is the sight method. By this method a sight is taken between two points on adjacent supports at the proper distance below the supporting point for the calculated sag for that particular length of span, type of conductor and temperature. If the sight line shows the bottom dip of the sagging wire on line, then the wire tension is correct.

The sight method used of which I am aware, utilizes so called sag gauges on adjacent conductors so that the inspector checking the sag of the wire has to climb one support and set up a sag gauge upon it, then climb the next support and set up the sag gauge on it. When there are multiple conductors on cross arms of the support, the inspector may have to walk back and forth and climb the pole several times to complete the check of the sag for this particular span. It is the purpose of my invention to provide a novel sag gauge construction whereby the sag of a plurality of conductors between two supports may be checked from one of the supports without walking back and forth and without climbing the supports several times.

It is a specific purpose of my invention to provide a sag gauge which embodies a clamping device whereby the sag gauge may be secured on a cross arm or other support, a suspension bar carried by the clamping device and sighting means so mounted on the suspension bar that it may be used to sight along two parallel lines, one at cross arm level and the other at the desired sag levels below the cross arm level between two supports regardless of whether the supports are at the same elevation.

The nature and advantages of my invention will appear more fully from the following description and the accompanying drawings wherein a preferred form of the invention is shown. It should be understood, however, that the drawings and description are illustrative only and are not intended to limit the invention except insofar as it is limited by the claims.

In the drawings:

Fig. 1 is a view in side elevation of my improved sag gauge;

Figure 2 is a sectional view taken on the line 2—2 of Figure 1;

Figure 3 is a somewhat diagrammatic view showing my invention as used to determine the correctness of sag of a conductor between two adjacent posts;

Figure 4 is a view looking at Figure 3 from the left hand end;

Figure 5 is an enlarged plan view illustrating the mounting of the sag gauge on the clamping device which supports it on the cross arm;

Figure 6 is a view looking at Figure 5 from the line 6—6;

Figure 8:
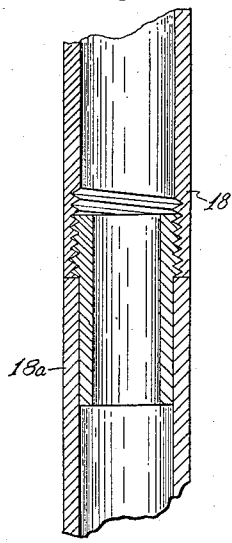
Figure 8 is an enlarged sectional view taken on the line 8—8 of Figure 1.

My invention as illustrated in the drawings provides a sag gauge which enables the inspector to climb only one pole or support to determine whether the sag of the wires is correct on two adjacent spans. Having made his inspection, the inspector can then walk to the second pole away and again check the sag of the wires on the two adjacent spans by climbing this pole and utilizing my improved sag gauge. The detailed construction of the sag gauge and the manner of its use will now be described.

The sag gauge comprises a clamping member 10 which is adapted to be set over a cross bar 11 which supports the insulators 12 on which the conductor wire 13 is carried. In the drawings I have illustrated the sag gauge in connection with only one conductor wire, although it is evident that there may be several conductor wires on the cross arm 11. In the preferred form of the invention the clamping device 10 is provided with a yoke 14 in which a ring 15 is pivoted by a pivot post 16 and an adjustable pivot post 17. The ring 15 slidably receives a sag indicating bar 18 which is preferably made of cylindrical tubing. The bar 18 can slide up and down in the ring 15 and it is marked with a suitable scale as indicated at 19 for measuring purposes. Both ends of the bar 18 are formed as illustrated in the sectional view of Figure 8, so that extensions such as 18a may be fitted thereto. The cotter pins 20 keep the ring 15 on the bar 18.

The bar 18 is adjustable up and down with respect to the ring 15 and held in adjusted position by a set screw 21 having a wing head 22. Another ring 23 is fitted on the bar 18 at a distance below the ring 15. This ring 23 is also held in adjusted position by a set screw 24 having a wing head 25.

The sighting device which I utilize comprises a sleeve 26, a mounting bracket 27 on the sleeve and a sighting bar 28 which is clamped to the bracket by a clamping member 29 which also forms a pivot for the sighting bar 28. The sighting bar has two pointed sight pins 30 and 31 thereon. The member 29 is threaded into a block 32 which is secured on the bracket 27. The member 29 has a shoulder 33 for engaging the sighting bar 28 and it has a wing head 34 by which it can be readily turned.

It is believed that the advantages of my invention will be best illustrated by describing an actual operation of the device in checking the sag of a conductor. The sag gauge is first attached to the cross arm 11 by setting the clamping device 10 on the cross arm and by tightening the set screw 10a which is carried by the clamping device. The next step is to loosen the set screw 21 and to move the bar 18 upwardly or downwardly as needed until the zero mark on the scale 19 is at the same level with the conductor attachment to the insulator. The set screw 21 is then tightened so as to leave the zero mark even with the conductor at its point of support on the insulator. If the bar 18 does not hang vertical, it can be set to vertical position by loosening the member 17 so that the bar will hang free. The member 17 is then tightened to keep the bar 18 in vertical position.

The next step is to move the ring 23 and the sleeve 26 upwardly or downwardly as necessary and to take a sight along the points 30 and 31 across the bottom of the cross arm 11 on the pole where the gauge is located, to the bottom of the cross arm on the adjacent pole. When the points 30 and 31 and the bottoms of the two cross arms are in line, the member 29 is tightened to secure the sighting bar 28 in fixed position on the bracket 27.

The sight bar support bracket 27 is mounted on the sleeve 26 in such a manner that the top edge of the sleeve 26 is at the same level as the points of the sight pins 30 and 31. The inspector using the device knows what the correct sag should be, and moves the ring 23 until the top edge of the sleeve 26 intersects the scale 19 at the desired position. Since the pins 30 and 31 are positioned in line with this edge, they are located at the proper sag distance. The inspector then tightens the set screw 24 to secure the ring 23 in position. The inspector can determine by sighting across the points 30 and 31 whether the conductor 13 sags below the line of sight or is above it. If the lowest point on the conductor 13 is below the line of sight, then the sag is too much and if the conductor is above the line of sight, the sag is too little. The exact amount of sag can also be read for any conductor between the two poles A and B merely by adjusting the ring 23 up and down until the bottom of the sag of the conductor is aligned with the line of sight across the points 30 and 31.

After having checked one conductor the inspector can check all of the other conductors on the cross arm provided the cross arm is horizontal by simply turning the sight bar 28 and its sleeve 26 on the bar 18. As soon as the check has been made for the conductors between the posts A and B, the sight bar 28 can again be adjusted at the proper angle to align its points 30 and 31 with the cross arms 11 on the post A and on the adjacent post in the other direction. The checking of the sag of the conductors for this span is completed in the same fasion as for the spans between the posts A and B.

Figure 7:
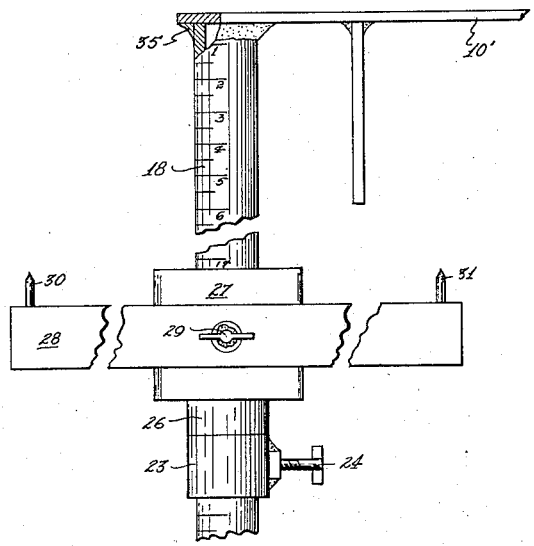
Figure 7 is a view in side elevation of a modification.

The modification, shown in Figure 7, is more simple than the preferred form of the invention. In this form of the invention, the top end of the bar 18 is fixed to the clamp 10' by welding as indicated at 35. When the sag of two spans of wire adjacent to a pole is to be taken with this modification, the clamp 10' is put over the cross arm and secured. Next the screw 24 and the clamp member 29 are loosened and the parts 23, 26 and 28 are adjusted to bring the points 30 and 31 into coincidence with a straight line from the bottom of the cross arm carrying the gauge to the bottom of the cross arm at the other end of the span being checked. The sight bar 28 is locked in position by tightening the member 29. Then the sight bar 28 is lowered so that the required amount of sag is shown along the top of the sleeve 26. Then sighting across the points 30—31 and by turning the sleeve 26, the bottom of the sag for all the conductors on the cross arm can be brought into sight. At once it can be seen whether the sag of any of these conductors is incorrect and whether the sag is too much or too little.

It is believed that the nature and advantage of my sag gauge will be apparent from the foregoing description. Having thus described my invention, I claim:

1. A sag gauge adapted for checking the correctness of sag of wires such as telephone and telegraph lines between supports which comprises a gauge mount adapted for attachment to one of the supports, a suspension bar suspended from the mount, a sight bar support movable up and down on the suspension bar and turnable about the suspension bar as an axis, a collar slidably mounted on the suspension bar beneath the sight bar support, said collar having means thereon to clamp it in fixed relation to the bar whereby to support said sight bar support for free rotation on the bar at a desired level, and a sight bar mounted on the sight bar support for pivotal adjustment about an axis perpendicular to the suspension bar.

2. A sag gauge adapted for checking the correctness of sag of wires such as telephone and telegraph lines between supports which comprises a gauge mount adapted for attachment to one of the supports, a cylindrical suspension bar depending from the mount, a sleeve rotatable on the bar, a collar on the bar beneath the sleeve and adjustable lengthwise of the bar for holding the sleeve at a desired level thereon without limiting the rotation of the sleeve, a sight bar mount on the sleeve having a flat face parallel to the suspension bar, a sight bar, a securing pin threaded in said sight bar mount and extending through the sight bar to pivotally mount the sight bar for pivotal movement in a plane parallel to the suspension bar, said securing pin having a shoulder thereon for clamping the sight bar against said flat face.

References Cited in the file of this patent

UNITED STATES PATENTS

| | | |
|---|---|---|
| 685,455 | Kinkead | Oct. 29, 1901 |
| 1,903,333 | Botel | Apr. 4, 1933 |
| 2,261,741 | Mathieu | Nov. 4, 1941 |
| 2,366,430 | Benton | Jan. 2, 1945 |
| 2,580,674 | Griffin | Jan. 1, 1952 |
| 2,798,296 | Liskey | July 9, 1957 |

FOREIGN PATENTS

| | | |
|---|---|---|
| 729,628 | Germany | Dec. 19, 1942 |
| 278,632 | Switzerland | Feb. 1, 1952 |